United States Patent
Suzuki et al.

[11] Patent Number: 6,116,211
[45] Date of Patent: Sep. 12, 2000

[54] INJECTION CONTROL FOR DIRECT INJECTED ENGINE

[75] Inventors: Yuichi Suzuki; Daijiro Tanaka; Uichitake Uchiyama, all of Iwata, Japan

[73] Assignee: Yamaha Hatsudoki Kabushiki Kaisha, Iwata, Japan

[21] Appl. No.: 09/444,979

[22] Filed: Nov. 22, 1999

Related U.S. Application Data

[62] Division of application No. 09/070,270, Apr. 30, 1998, Pat. No. 6,035,822.

[30] Foreign Application Priority Data

Apr. 30, 1997 [JP] Japan ................................. 9-128089

[51] Int. Cl.⁷ .............................. F02B 15/00; F02B 5/02
[52] U.S. Cl. ........................ 123/305; 123/298; 123/276
[58] Field of Search ................................. 123/276, 279, 123/280, 295, 298, 305; 701/105

[56] References Cited

U.S. PATENT DOCUMENTS

| | | | |
|---|---|---|---|
| 948,308 | 2/1910 | Burt ...................................... | 123/65 A |
| 2,028,760 | 1/1936 | Dillstrom ............................... | 123/305 |
| 2,046,264 | 6/1936 | Hesselman et al. ..................... | 123/276 |
| 3,498,275 | 3/1970 | Hardenberg ............................. | 123/260 |
| 3,498,276 | 3/1970 | Hardenberg ............................. | 123/260 |
| 4,318,377 | 3/1982 | Occella et al. .......................... | 123/279 |
| 5,107,810 | 4/1992 | Wu et al. .................................. | 123/298 |
| 5,259,348 | 11/1993 | Hobayashi et al. ..................... | 123/260 |
| 5,735,240 | 4/1998 | Ito et al. .................................. | 123/295 |
| 5,775,288 | 7/1998 | Suzuki et al. ............................ | 123/298 |
| 5,975,044 | 11/1999 | Kamura et al. .......................... | 123/295 |
| 5,979,398 | 11/1999 | Yanagihara .............................. | 123/299 |
| 6,032,637 | 3/2000 | Mamiya et al. ......................... | 123/295 |
| 6,035,822 | 3/2000 | Suzuki et al. ............................ | 123/276 |

FOREIGN PATENT DOCUMENTS

| | | |
|---|---|---|
| 0 496 029 | 7/1992 | European Pat. Off. . |
| 0 639 703 | 2/1995 | European Pat. Off. . |
| 0 694 682 | 1/1996 | European Pat. Off. . |
| 0 741 237 | 11/1996 | European Pat. Off. . |

OTHER PUBLICATIONS

Euorpean Search Report date Jun. 7, 1999.
Patent Abstracts of Japan, vol. 018, No. 568 (M–1695), Oct. 31, 1994 & JP 06 207542 A (Toyota Motor Corp), Jul. 26, 1994 *abstract*.
Patent Abstracts of Japan, vol. 018, No. 338 (M–1628), Jun. 27, 1994 & JP 06 081651 A (Mitsubishi Motors Corp), Mar. 22, 1994 *abstract*.
Patent Abstracts of Japan, vol. 016, No. 576 (M–1345), Dec. 16, 1992 & JP 04 224231 A (Toyota Motor Corp), Aug. 13, 1992 *abstract*.
Patent Abstracts of Japan, vol. 018, No. 338 (M–1628), Jun. 27, 1994 & JP 06 081655 A (Toyota Motor Corp), Mar. 22, 1994 *abstract*.

*Primary Examiner*—Henry C. Yuen
*Assistant Examiner*—Hieu T. Vo
*Attorney, Agent, or Firm*—Knobbe, Martens, Olson & Bear LLP

[57] ABSTRACT

A direct injected, internal combustion engine combustion chamber configuration and injection control strategy. Stratification is accomplished by providing a piston bowl and air flow pattern within the combustion chamber through intake passage shape and squish action. The shape of the combustion chamber also provides rapid flame propagation even at low speeds and loads. The timing of injection of fuel from the fuel injector is such that under low speed/low load conditions the injector begins its injection at a time when the piston is at the end of its compression stroke and under other running conditions the fuel injector begins its injection during the intake stroke

24 Claims, 13 Drawing Sheets

INJECTION CONTROL FOR DIRECT INJECTED ENGINE

CROSS REFERENCE TO RELATED APPLICATION

This application is a division of our application entitled, "Combustion Chamber For Direct Injected Engine", Ser. No. 09/070270, Filed Apr. 30, 1998, now U.S. Pat. No. 6,035,822 issued Mar. 14, 2000 and assigned to the assignee hereof.

BACKGROUND OF THE INVENTION

This invention relates to a direct injected internal combustion engine and more particular to an improved injection control for such an engine.

There continues to be a demand for improved performance in internal combustion engines. Although alternative power sources have been considered, internal combustion engines still offer a very efficient and environmentally friendly supply of power. However, in many applications for engines, such as in powering vehicles, the engine is required to run over widely varying load and speed ranges. It is very difficult to ensure good performance, maximum fuel economy, and effective emission control under all such running conditions.

Various devices have been proposed so as to improve the performance of an engine and also to improve its flexibility. In order to obtain better combustion control, it has been proposed to employ direct cylinder injection. With direct cylinder injection, the fuel is injected directly into the combustion chamber of the engine. This has a number of advantages.

One of the important advantages of using direct cylinder injection is that it lends itself to achieving stratification in the combustion chamber. A conventional engine has a homogeneous fuel/air mixture in the entire combustion chamber at the time of combustion, regardless of the load. This means that the cylinder is overcharged with fuel under most running conditions.

Thus, attempts to provide what is referred to as "lean burn" have been resorted to. By running on a lean burn condition, the entire combustion chamber is not charged with a homogeneous, stoichiometric fuel/air mixture. If there can be provided a stoichiometric patch of fuel at the spark gap at the time of firing, the entire cylinder need not be charged with a stoichiometric mixture. This has obvious advantages from the point of not only fuel economy, but also exhaust emission control.

However, in order to achieve this stratification, it is necessary to have the combustion chamber appropriately configured and to have the fuel injector position so as to spray into the optimum position to achieve stratification. This problem is particularly acute when utilizing multiple valves and overhead cam shafts. Also there are times when stratification is either not desirable or the degree of stratification should be limited.

Therefore it is a principle object of this invention to provide an improved fuel injection position for an engine having direct injection and wherein stratification can be achieved and its degree controlled.

SUMMARY OF THE INVENTION

The features of this invention are adapted to be embodied in an internal combustion engine that has a cylinder block, cylinder head assembly that defines a cylinder bore closed at one end by a surface of the cylinder head portion of the cylinder block, cylinder head assembly. A piston reciprocates in the cylinder bore and forms a combustion chamber with the cylinder bore and the cylinder head surface. An intake passage arrangement extends from an inlet opening in an outer surface of the cylinder block, cylinder head assembly and serves the combustion chamber through an intake valve seat formed in the cylinder head surface. The intake valve seat lies substantially on one side of a first plane containing the axis of the cylinder bore. A poppet type intake valve is supported in the cylinder head portion for controlling the opening and closing of the intake valve seat. An exhaust passage extends from an exhaust valve seat disposed in the cylinder head surface on the opposite side of the first plane from the intake valve seat. This exhaust passage exits the cylinder block, cylinder head assembly through an outlet opening formed in the cylinder head portion. A fuel injector is mounted in the cylinder block, cylinder head assembly with a discharge port that is directed into the combustion chamber so as to spray in a direction generally toward the cylinder bore axis. A control controls the timing and duration of injection of fuel from the fuel injector In accordance with an engine embodying the invention, the control for the timing of injection of fuel from the fuel injector begins its injection at a time when the piston is at the end of its compression stroke under low speed/low load conditions and under other running conditions the fuel injector begins its injection during the intake stroke.

In accordance with a method for operating the engine in accordance with the invention, the control for the timing of injection of fuel from the fuel injector begins injection at a time when the piston is at the end of its compression stroke under low speed/low load conditions and under other running conditions the fuel injector begins its injection during the intake stroke

DETAILED DESCRIPTION OF THE PREFERRED EMBODIMENTS

Figure 1:
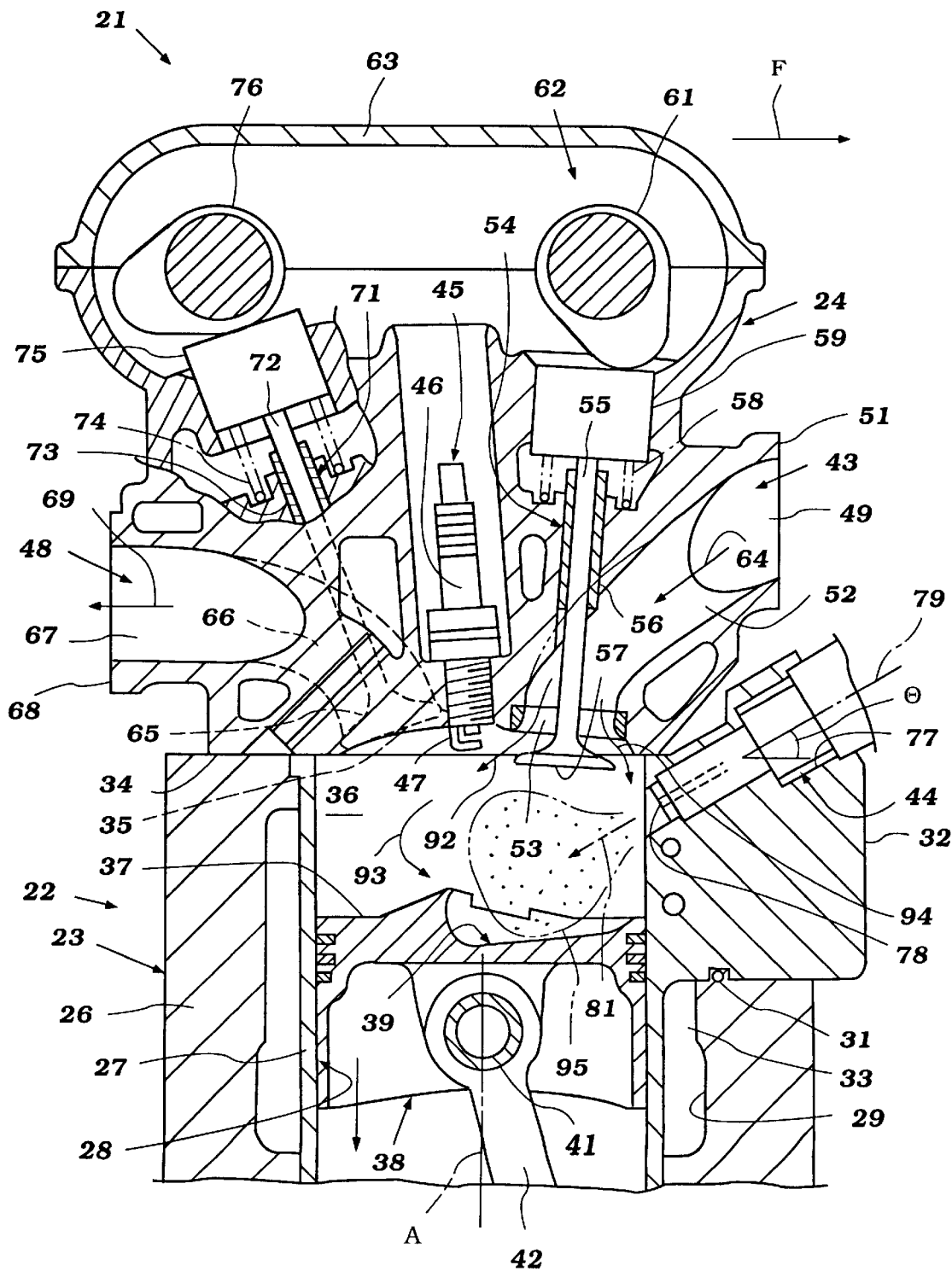
FIG. 1 is a partial cross-sectional view taken through a single cylinder of an internal combustion engine constructed and operated in accordance with an embodiment of the invention and is taken generally along the line 1—1 of FIG. 2.
Figure 2:
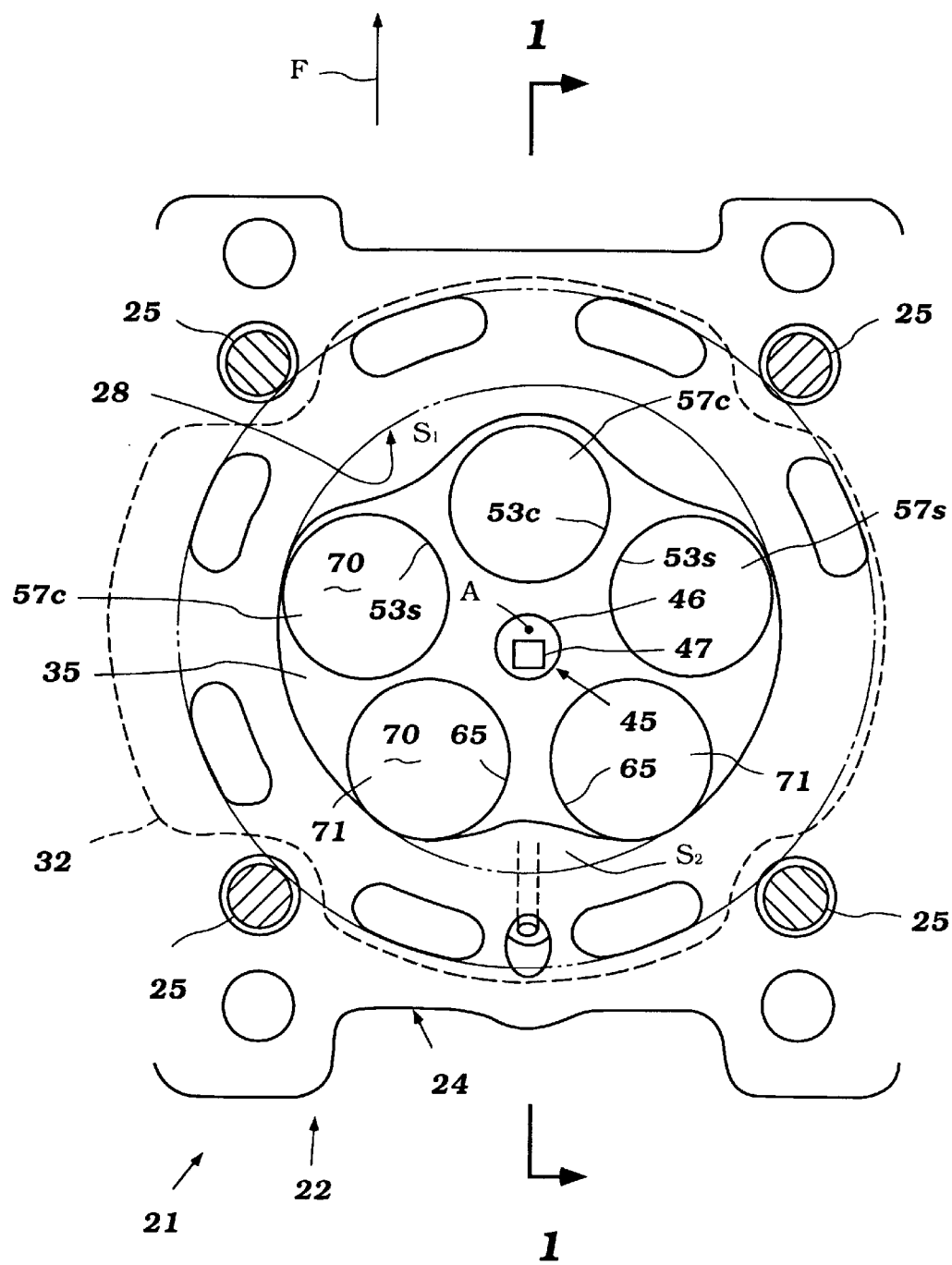
FIG. 2 is a bottom plan view of the cylinder head with the cylinder liner shown in phantom lines so as to permit understanding of the orientation of the components to each other.

Referring now in detail to the drawings and initially primarily to FIGS. 1 and 2, an internal combustion engine constructed and operated in accordance with an embodiment of the invention is identified generally by the reference numeral 21. The engine 21 is depicted in the figures only partially and only a single cylinder is shown. The invention deals primarily with the combustion chamber configuration and the porting and injection timing control arrangement. Therefore, only the upper portion of the engine has been shown. Where any components are not illustrated or described, they may be considered to be conventional.

Also, although the invention is described in conjunction with only a single cylinder, it will be readily apparent to those skilled in the art how the invention can be employed in conjunction with engines having more than one cylinder and also engines having varying cylinder configurations such as in line, V-type, opposed, etc.

The engine 21 is comprised primarily of a cylinder block, cylinder head assembly, indicated generally by the reference numeral 22 and which is comprised of a cylinder block portion 23 and a cylinder head assembly portion 24. In the illustrated embodiment, the cylinder head assembly 24 is detachably affixed to the cylinder block assembly 23 by means including studs 25 and fasteners, which are not shown. The invention can, however, be utilized in conjunction with engines in which the cylinder block, cylinder head assembly is unitary or formed in other manners as should be readily apparent to those skilled in the art.

The cylinder block assembly 23 includes a main cylinder block member 26 which may be formed from a light alloy casting such as aluminum or aluminum alloy. Pressed, cast are otherwise secured in place in the cylinder block 26 is a cylinder liner 27 which may be formed from a dissimilar material having a harder more wear resistant surface. This cylinder liner 27 defines a cylinder bore 28 having a cylinder bore axis A.

The main cylinder block member 26 is formed with a cavity 29 which partially surrounds the cylinder liner 27 and which forms a cooling jacket 31 through which a liquid coolant is circulated in a known manner.

The cylinder liner 27 has a projecting portion 32 at one side thereof which is formed for a reason which will be described shortly. To provide a seal, an 0-ring or other type of sealing arrangement 33 is provided between the cylinder liner projection 32 and the main cylinder block member 26.

The cylinder head member 24 has a lower surface 34 that is held in abutting relationship with the upper deck of the cylinder block 26 in sealing relationship around the cylinder liner 27. A suitable cylinder head gasket (not shown) may be provided between the cylinder head surface 34 and the main cylinder block member 26 for assisting in the sealing, as is well known in the art.

The portion of the cylinder head member 24 that overlies the cylinder bore 28 is formed with a recessed surface 35 which has a configuration as will be generally described and which cooperates with the cylinder bore 28 to form in part the combustion chamber, indicated generally by the reference numeral 36. The definition of this combustion chamber is completed by the head portion 37 of a piston 38 that is reciprocally supported in the cylinder bore 28. This piston head 37 has a configuration which will be described in more detail by reference to FIGS. 3–5 and which includes a bowl portion 39 which is offset to one side of the combustion chamber 36, for a reason which will also be described.

The piston 38 is connected by means of a piston pin 41 to the upper or small end of a connecting rod 42. The lower end of the connecting rod 42 is journaled on a throw of the crankshaft, which is not illustrated for the reason already noted.

The cylinder head assembly 24 is provided with an intake passage arrangement, indicated generally by the reference numeral 43 for delivering a air charge to the combustion chamber 36. This intake passage arrangement 43 is located predominantly on one side of a plane extending perpendicularly to FIG. 1 and containing the cylinder bore axis A. For orientation purposes, this side may be considered to be the front side of the engine 21 when installed in a vehicle. The arrow F in FIGS. 1 and 2 indicated this front or intake side of the engine 21.

A fuel injector, indicated generally by the reference numeral 44 is mounted in the cylinder block assembly 23 in a manner to be described for injecting a charge of fuel into the combustion chamber 36 for mixing with the air inducted through the intake passage arrangement 43. This mixing will be described also in more detail later.

A spark plug, indicated generally by the reference numeral 45 has an insulator portion 46 and is mounted in a tapped opening formed centrally in the cylinder head recess surface 35 so that its spark gap 47 is positioned approximately on the cylinder bore axis A as best seen in FIG. 2. The spark plug 45 is fired by a suitable ignition system in a timing sequence, which will also be described later.

The charge which is ignited by the firing of the spark plug 45 by having a spark jump the gap 47 will burn and expand to drive the piston 37 downwardly. On the exhaust stroke, the burnt charge is discharged through an exhaust passage arrangement, indicated generally by the reference numeral 48 and which is formed primarily on the opposite or rear side of the aforenoted first plane that contains the cylinder bore axis A.

The intake passage arrangement 43 is comprised of an inlet opening 49 that is formed in an outer surface 51 of the cylinder head assembly 24. A suitable induction system is affixed to this surface 51 for delivering an air charge to the intake passage arrangement inlet opening 49. Although this induction system is not shown, it may include, among other things, an atmospheric air inlet device that draws air from the surrounding atmosphere and which may include a filtering and silencing arrangement. This air is then delivered to a throttle body and to the individual inlet openings 49 by an intake manifold arrangement of any suitable type.

From the inlet opening 49, the intake passage arrangement 43 branches into three branch portions from a common section, each branch section being indicated generally by the reference numeral 52. The branch sections 52 each terminate at a respective intake valve seat 53.

Figure 3:
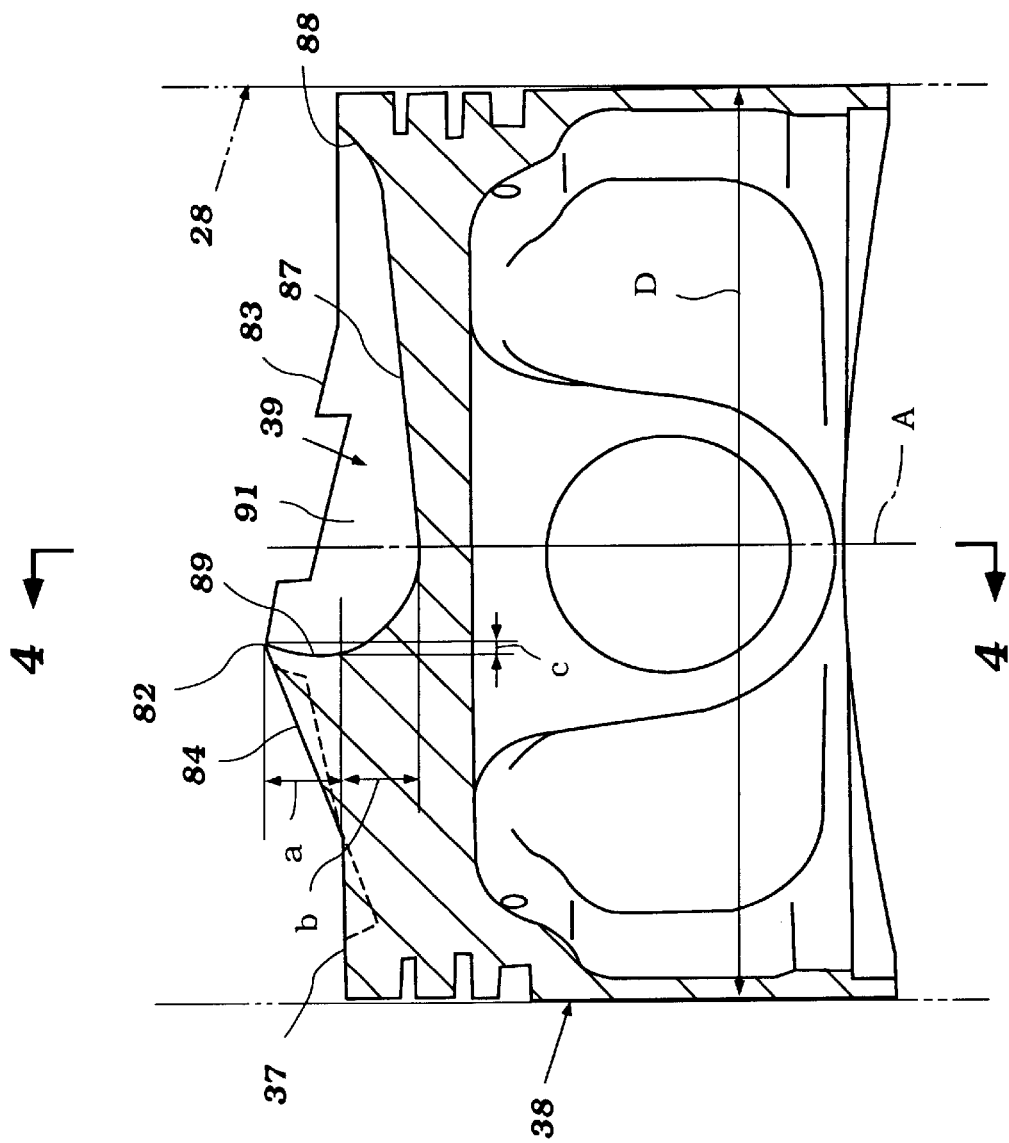
FIG. 3 is an enlarged cross-sectional view of the piston taken along the same plane as FIG. 1.

As may be best seen in FIG. 3, the intake valve seats 53 are comprised of a center intake valve seat 53c which is disposed further from the aforenoted first plane containing the cylinder bore axis A than the remaining side intake valve seats 53s. These side valve seats 53s lie substantially on the front side of the aforenoted plane but do extend slightly over it to the exhaust side. This is done so as to provide a large inlet flow area and also so as to establish a tumble motion in the combustion chamber under at least some running conditions, as will also be described shortly.

There is a second plane which is actually the plane about which FIG. 1 is taken and which extends perpendicularly to the aforenoted first plane and which also passes through the cylinder bore axis A. The center intake valve seat 53c is disposed substantially on this plane and is bisected by it. The side intake valve seats 53s are on opposite sides of this second plane at equal distances from it.

Three poppet-type intake valves, each indicated by the reference numeral 54 are provided for valving the valve seats 53. These valves 54 have stem portions 55 that are slidably supported in valve guides 56 pressed or otherwise inserted into the cylinder head member 24. The valves 54 also have head portions 57 that cooperate with the respective valve seats for valving the flow through them. These head portions 57 are indicated by the reference characters 57c and 57s so as to relate to the respective valve seats 53c and 53s.

Keeper retainer assemblies (not shown) retain coil compression springs 58 for urging each of the intake valves 54 to its closed position. These valves 54 are opened by means of thimble tappets 59 that are operated by the lobes of an intake camshaft 61. The intake camshaft 61 is journaled for rotation in a suitable manner within a cam chamber 62 formed at the upper end of the cylinder head member 24 and closed by a cam cover 63. The intake cam shaft 61 is driven by a suitable timing drive at one-half crankshaft speed, as is well known in the art.

It should be noted that the intake passage arrangement 43 is such that the intake passage portions 52 extended downwardly toward the cylinder bore axis A and specifically toward the aforenoted first plane that contains this axis. Immediately adjacent the valve seats 53, the intake passage arrangements 52 have a slight curvature so as to provide a substantially unrestricted flow path, which is indicated generally by the arrows 64. This flow path will be described in some more detail later when the arrangement associated with the fuel injector 44 and the piston bowl 39 is also described.

The exhaust passage arrangement 48 is comprised of a pair of exhaust valve seats 65 that are disposed on the opposite of the first plane from the intake valve seats 53 and at substantially equal distances on opposite sides of the second plane from each other, these being the two planes aforenoted that contain the cylinder bore axis A.

These exhaust valve seats 65 merge into exhaust passages 66 which, in turn, terminate at a common exhaust opening 67 formed in an outer side surface 68 of the cylinder head member 24. The surface 68 is disposed on the opposite side of the cylinder head 24 from the intake side surface 51. The exhaust gasses flow through this exhaust passage arrangement 48 in the direction indicated by the arrow 69. The exhaust gases are collected by an exhaust manifold (not shown) that is affixed to the cylinder head surface 68 in any suitable manner. This exhaust manifold cooperates with a suitable exhaust system for silencing and discharge of the exhaust gases to the atmosphere.

Poppet-type exhaust valves 71 are mounted in the cylinder head assembly 24 in a manner similar to the intake valves 54 and have head portions 70 for valving the exhaust valve seats 65. The poppet-type exhaust valves 71 include stem portions 72 that are supported within guides 73 that are cast, pressed or otherwise fixed into the cylinder head member 24. Coil compression springs 74 bear against keeper retainer assemblies affixed to the upper ends of the valve stems 72 for urging them to a closed position.

Thimble tappets 75 are supported in the cylinder head member 24 and are operated by the lobes of an exhaust camshaft 76 for opening the exhaust valves 71. The exhaust camshaft 76 like the intake camshaft 61 is journaled for rotation in the cylinder head member 24 in any known manner. Also, the exhaust camshaft 76 is driven by a timing drive at one-half crankshaft speed, like the intake camshaft 61.

Referring now to the mounting of the fuel injector 44 and primarily to FIG. 1, as has been noted, the cylinder liner 27 is provided with an extending projection 32. An injector receiving opening 77 is formed in this projection and the fuel injector 44 is mounted therein. The fuel injector 44 is of the solenoid operated type and includes a solenoid operated valve that controls the flow through a discharge nozzle port 78 in a manner known in this art.

The fuel injector 77 has its spray axis, indicated by the line 79, disposed at a relatively shallow angle to a horizontal plane which angle $\theta$ is preferably in the range of 30–45°. Also, as will be described later by reference to FIGS. 6–9, the fuel injector nozzle portion 78 is shrouded by the piston 38 during a portion of its stroke. This permits the use of a lower cost fuel injector than one which is constantly exposed to the high temperature and heat in the combustion chamber. In fact, the injector 44 and specifically its nozzle portion 78 is shrouded during the initial combustion cycle and hence, does not experience the highest temperatures and thus, can be made less costly.

Fuel is sprayed from the injector nozzle port 78 in a direction indicated by the arrow 81 in certain of the figures. This is directed generally toward the piston bowl 39, the shape of which will now be described by reference to FIGS. 3–5.

Before referring specifically to the configuration of the bowl 39, it should be noted that the head portion 37 has a generally flat outer peripheral surface from which a dome 82 protrudes. This dome 82 is formed by a pair of generally upwardly inclined upper surfaces 83 and 84 that extend from the intake and exhaust sides, respectively.

These domed surfaces 83 and 84 are formed with recesses 85 and 86 so as to clear the side intake valves 57s and the exhaust valves 71, respectively. It should be noted that the highest point of the dome 82 is offset slightly toward the exhaust side from the first plane that contains the cylinder bore axis A.

Referring now to the configuration of the bowl 39, it consist of a generally downwardly sloping lower wall 87 that begins at an arcuate recessed portion 88 which is adjacent the cylinder bore 28 and specifically adjacent the location of the fuel injector 44. This wall 87 slopes downwardly and expands outwardly reaching its lowest point at approximately the cylinder bore axis A.

From this point, the wall of the piston that defines the bowl has an arcuate section 89 which curves upwardly and which terminates at the dome 82. As a result, the wall 89 is somewhat recessed having an offset dimension C with the maximum offset being generally coextensive with the flat upper surface of the head 37. The depth of the recess C is preferably about 1 to 2% of the cylinder bore or piston diameter D.

Figure 4:
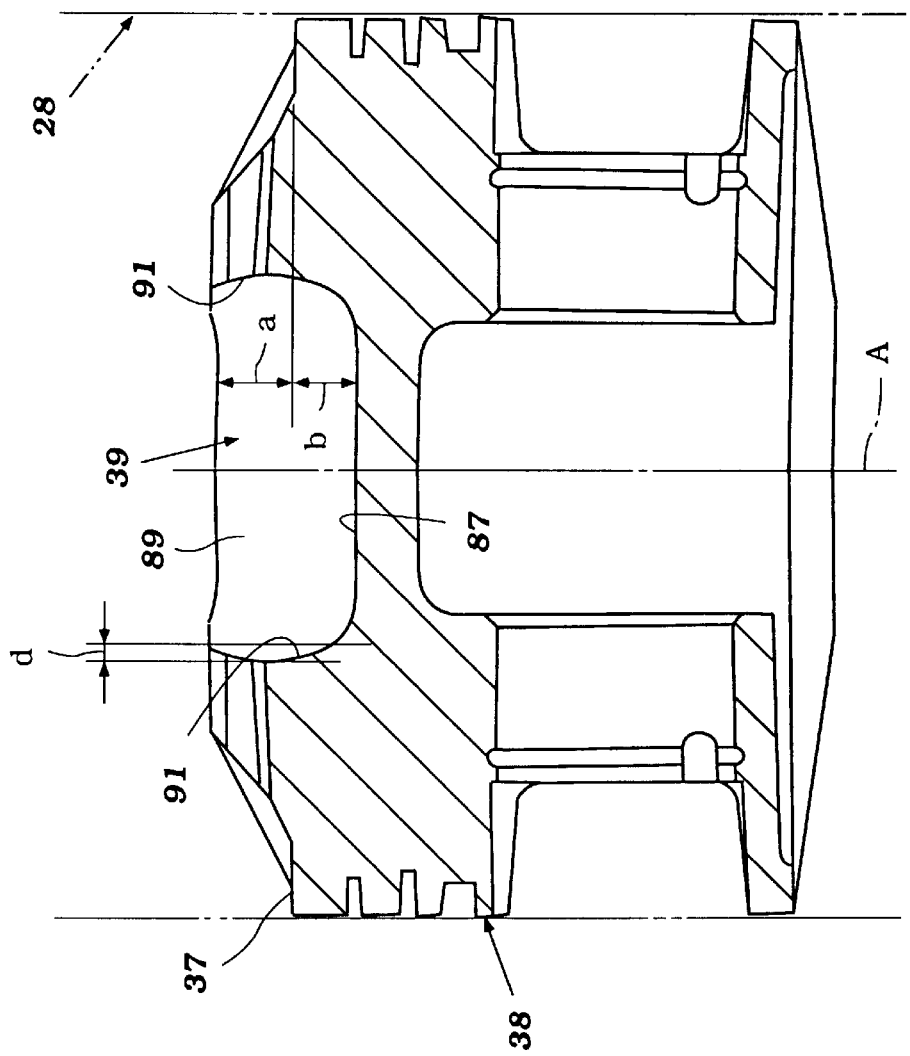
FIG. 4 is a cross-sectional view of the piston taken along the Line 4—4 of FIG. 3.
Figure 5:
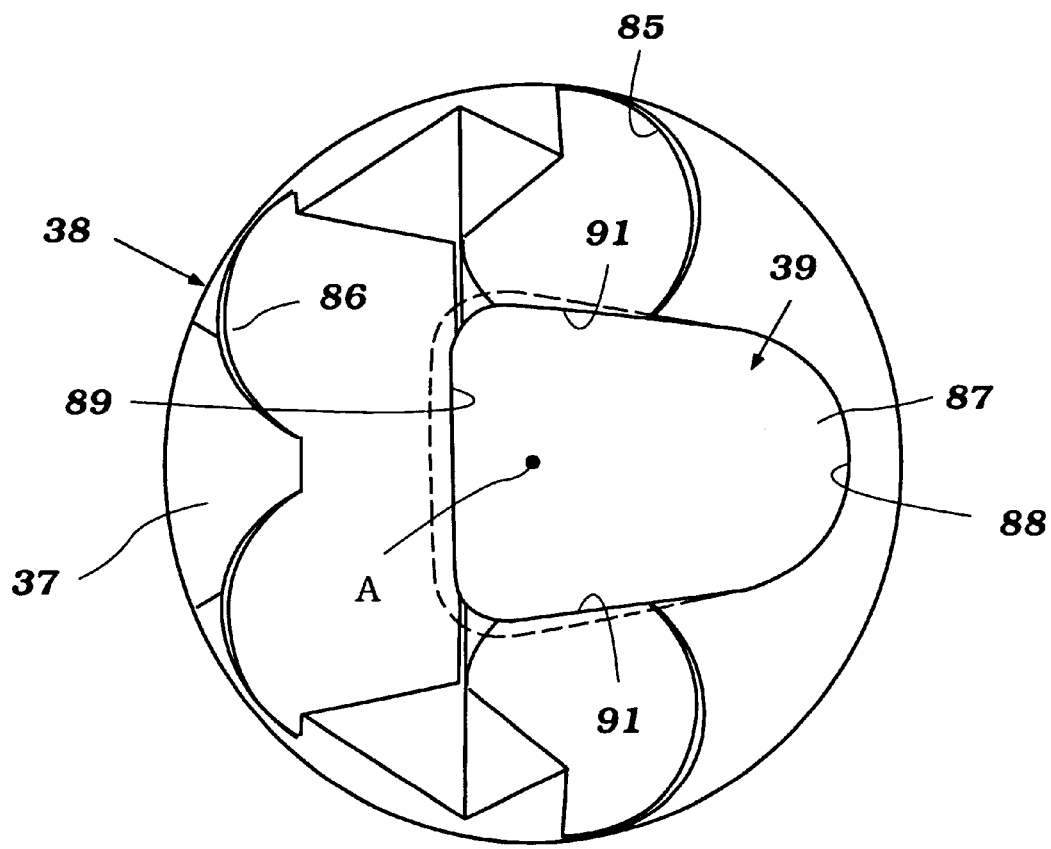
FIG. 5 is a reduced scale top plan view of the piston.
Figure 6:
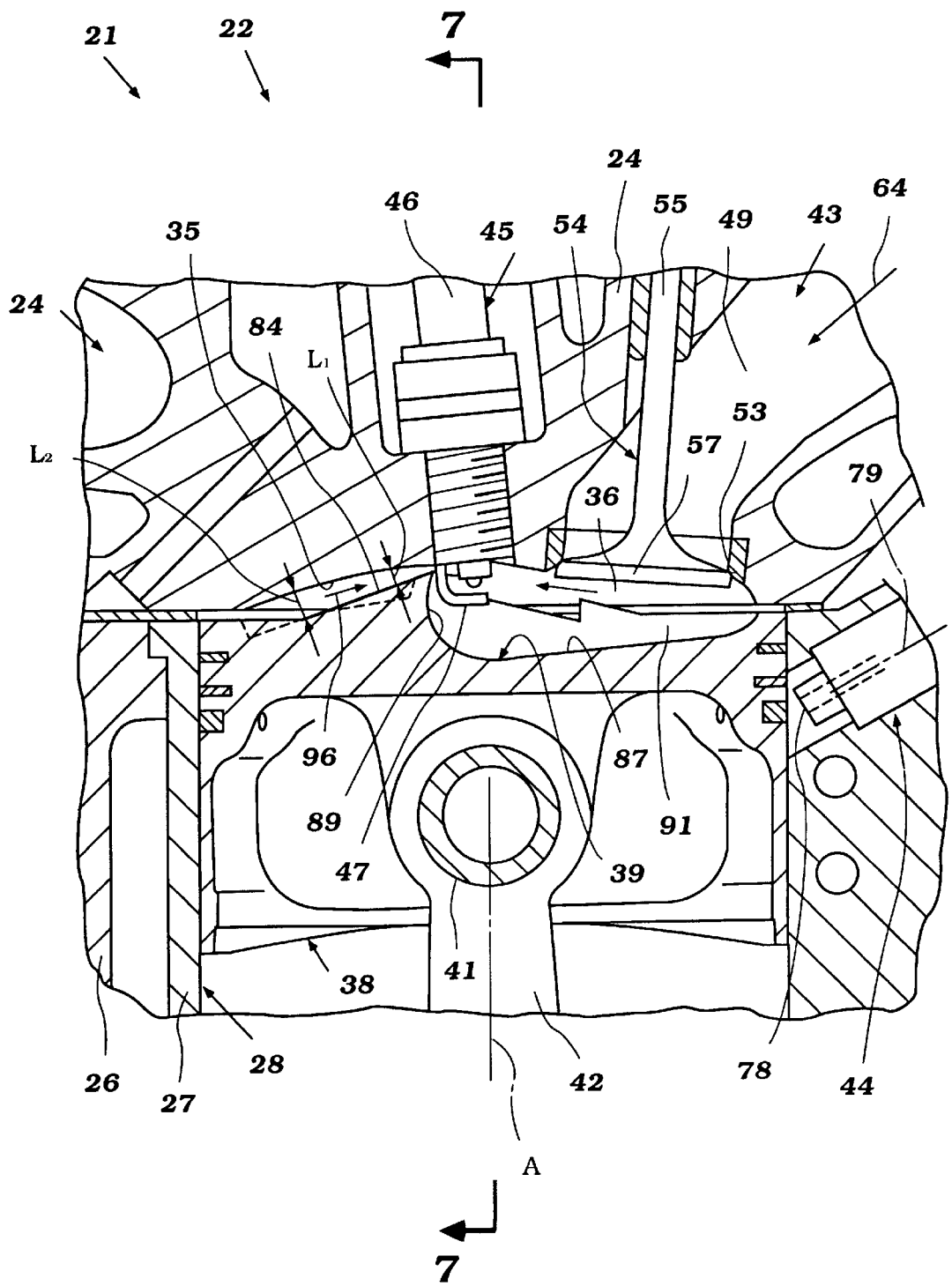
FIG. 6 is a partial cross-sectional view, in part similar to FIG. 1, but showing the piston at its top dead center position, and depicting the squish action that occurs due to the combustion chamber configuration.
Figure 7:
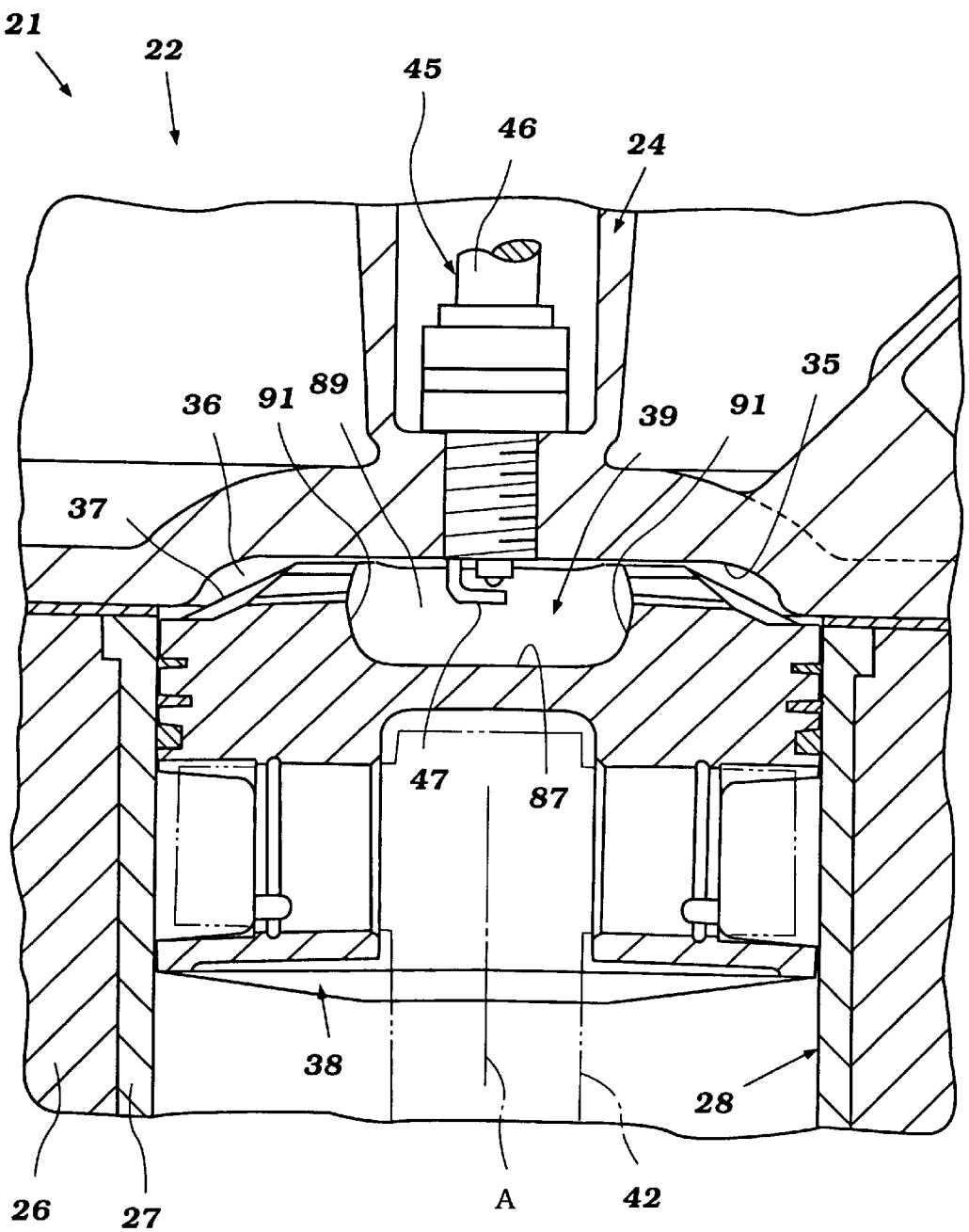
FIG. 7 is a cross-sectional view taken along the line 7—7 of FIG. 6.

Hence, the bowl is somewhat deeper below this surface than above it as indicated by the dimensions b and a, respectively in FIGS. 3 and 4. The dimension b is preferably in the range of 6 to 9% of the piston diameter D. The dimension a is preferably larger and in the range of 7 to 12% of the piston diameter D The side walls along the side edges of the lower wall 87 also have an arcuate curvature that extends upwardly toward the head portion as shown best in FIG. 4 which results in a further offsetting or recessing indicated by the dimension d with the curved portions being indicated by the reference characters 91. Again, the maximum offsetting of the dimension d is coextensive with the flat upper surface of the head portion 37. The dimension d b is preferably in the range of 1 to 2% of the piston diameter D.

As seen in FIG. 3, the recessed area 85 for the intake valves provide a flow area which facilitates the stratification of the fuel charge in the area of the bowl 39 as will now be described, primarily by reference to FIGS. 6–9.

Before referring specifically to these Figures, however, the airflow path during the induction cycle and at the beginning of the intake cycle will be described first by reference to FIG. 1. When the piston 38 is moving downwardly, the intake valves 54 will open, the timing of opening and closing of the valves being depicted in FIG. 11, and the air flows through the intake passage arrangement 49 in the direction indicated by the arrows 64 as previously noted.

In the area of the center intake valve head 57c this flow will be divided partially into a first part 92 that flows generally toward the first plane that contains the cylinder bore axis A and which passes generally toward the opposing cylinder wall for turning to create a tumble component indicated by the arrow 93 in this figure. On the other side of the center intake valve head 57c, there will be another flow path indicated by the arrow 94 which flows generally downwardly along the side of the cylinder bore.

The same effect will be present at the side intake valve heads 57s. Since they are closer to the first plane, however, the flow past these valve heads 57s will create a greater tumble flow than the center intake valve seat 53c.

As the piston continues it downward movement to the position shown in FIG. 1, the fuel injector 44 and specifically its nozzle portion 78 will be opened and injection can begin to deliver a fuel patch, indicated by the reference numeral 95. The timing of fuel injection will also be described later by reference to FIGS. 10 and 11. However, it should be seen that the fuel patch is somewhat confined by the tumbling airflow and by the shape of the piston bowl 39 so as to be stratified in this area when a small amount of fuel is injected.

Referring now to FIGS. 6–9, FIG. 6 shows the condition at top dead center of the piston. In this condition, the piston dome portion 84 and the cylinder head recess 35 will define a squish area where a squish flow, indicated by the arrow 96 is directed generally toward the spark gap 47. This squish area has a larger height $L_2$ at its outer peripheral edge and decreases at $L_1$ adjacent the spark plug so that the airflow will increase in velocity.

This has two effects, first, it will maintain the fuel charge in the area of the spark gap and also will generate some turbulence so as to improve combustion propagation. There is a somewhat smaller squish action achieved on the opposite side but there is a larger gap, in this area. Hence, this squish flow will be somewhat less. The other beneficial effect occurs after combustion has been initiated and will be described later.

Also, and as best seen in FIG. 2, the underside of the cylinder head around the recessed area 35 is provided with an intake squish area $S_1$ that directs the flow generally centrally in the combustion chamber. There is a somewhat smaller exhaust squish area $S_2$ on the opposite side which cooperates with the dome portion to achieve this squish flow 96 shown in FIG. 6.

It should also be noted that in the top dead center position, the spark gap 47 is disposed in the area of the bowl wall 89 and at the far end of the bowl 39 from where fuel has been introduced. This has two effects. First, it will ensure that even when small amounts of fuel have been injected, they will be concentrated at the spark gap 47 at the time of firing. In addition, because the spark gap 47 is positioned at substantially the center of the cylinder bore on the axis A it will be ensured that good flame propagation throughout the entire combustion chamber will occur, particularly when operating under higher loads and speeds and when more fuel has been injected.

Figure 8:
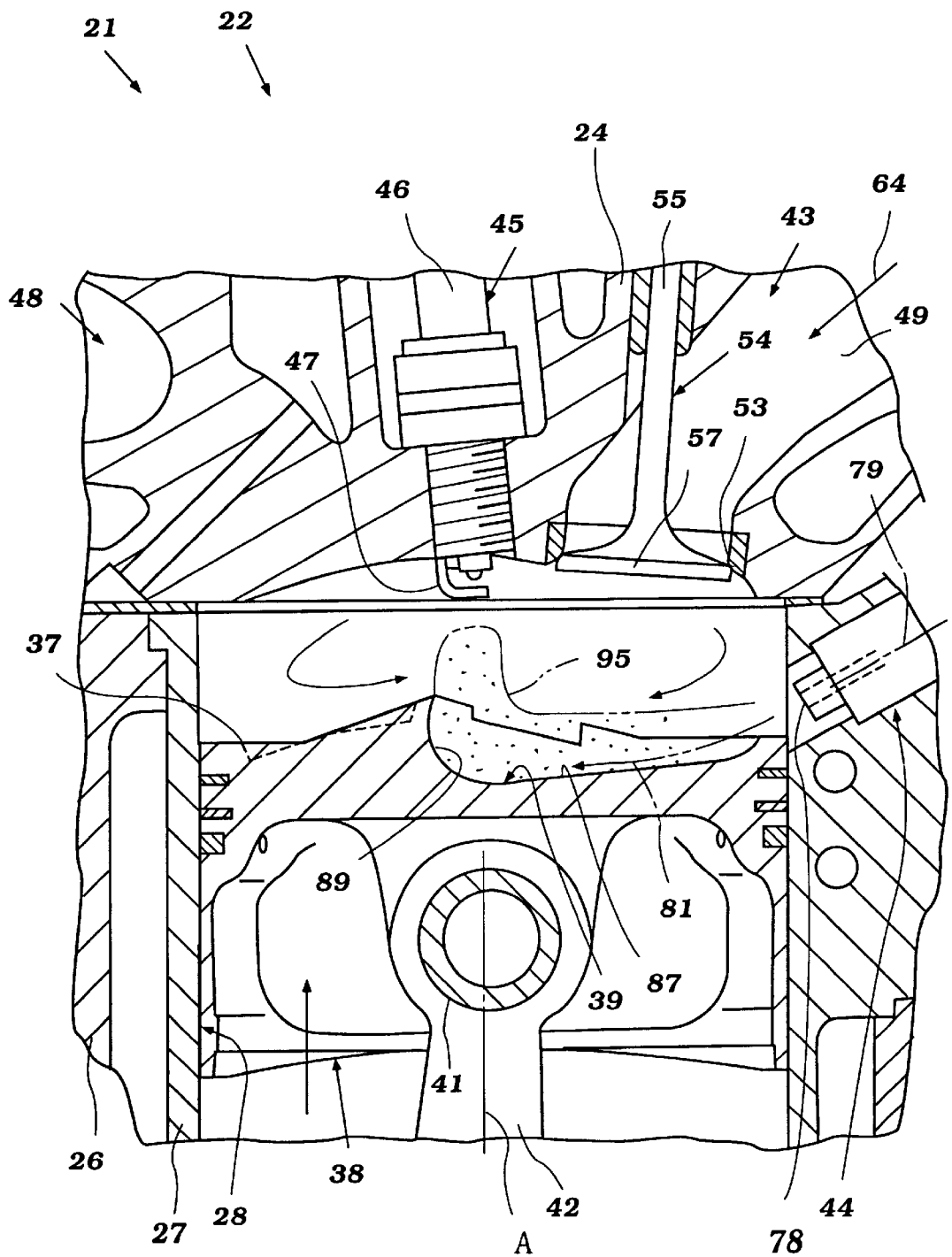
FIG. 8 is a cross-sectional view, in part similar to FIG. 6, but shows the piston on the compression stroke when running under low speed, low load conditions.
Figure 9:
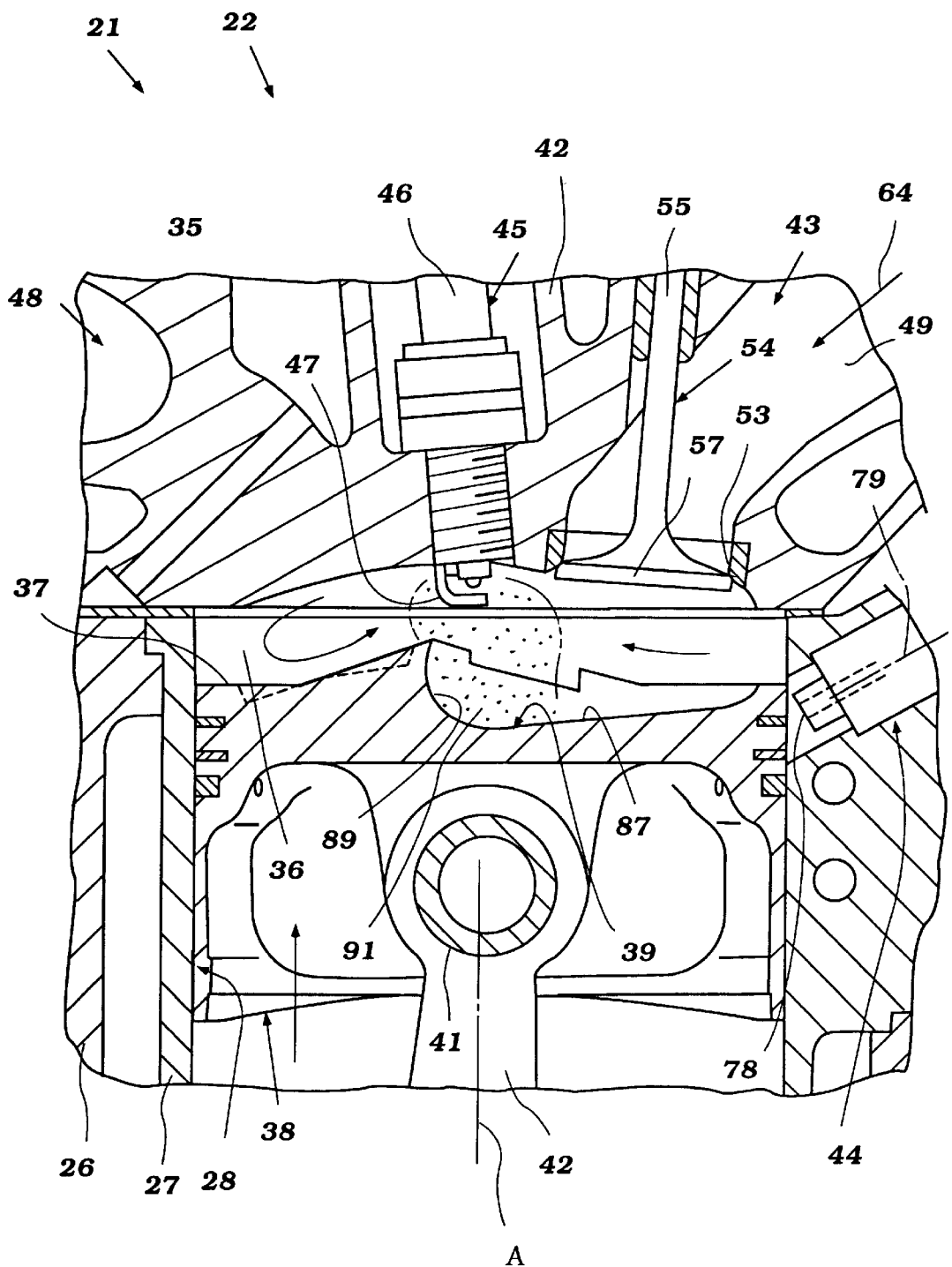
FIG. 9 is a cross-sectional view, in part similar to FIG. 8, and shows the continued motion of the piston toward top dead center and immediately prior to the firing of the spark plug.

Referring now specifically to FIGS. 8 and 9, they depict a condition when operating under low speed and low load. Under this condition, and as will be discussed later by reference to FIGS. 10 and 11, the fuel is injected toward the end of the compression stroke. Hence, as the piston 38 is moving upwardly toward top dead center position, the fuel injector 44 will discharge its fuel patch 95. Under this condition, the fuel will impinge primarily on the lower wall 87 of the bowl 39 and then flow upwardly along the side portions 89 and 91 and be deflected toward the spark gap 47 as seen in FIG. 8. The squish action and tumble action which has been generated as aforenoted will assist in confining the small fuel spray in this area.

As the piston 38 continues it upward movement, the injector nozzle portion 78 will be covered by the piston 38 and hence, the injector 44 will be shrouded. The fuel patch continues to move upwardly and toward the spark gap 47 at this time. The plug 45 is then fired and the charge, which is stoichiometric in the vicinity of the spark gap 47 will readily combust. The turbulence generated in the combustion chamber will ensure that this fuel patch will fully burn and that the plane will be propagated to the peripheral less than stoichiometric regions very quickly.

Also the dimensional relation between the piston head surface 84 and the cylinder head surface that results in the dimensions $L_1$ and $L_2$ will cause the flame front to eject through the gap $L_1$ and cause rapid and complete burning of fuel that has not been collected in the bowl 39.

Figure 12:
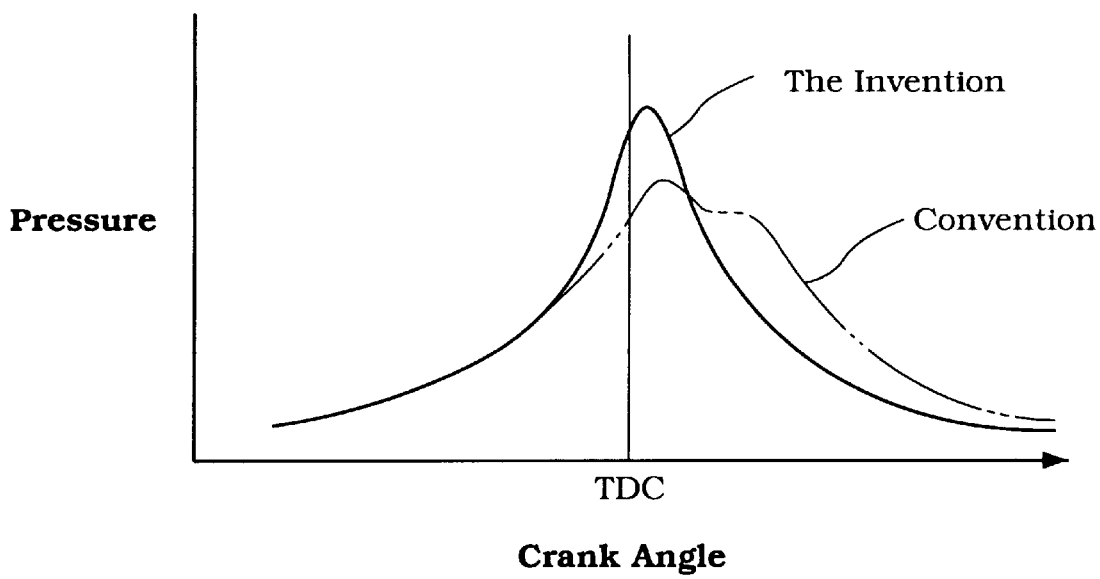
FIG. 12 is a graphical view showing how, in accordance with the invention, the peak pressure in the cylinder is controlled to obtain a more significant and improved power output.

Hence, it is possible to delay the timing of firing of the spark plug under this condition and obtain a higher peak pressure than in the prior art type the constructions as shown in FIG. 12. This result in more useful pressure application to the piston 38 and to improve the engine performance by insuring all fuel will be burned while using less total fuel than with the prior art.

Figure 10:
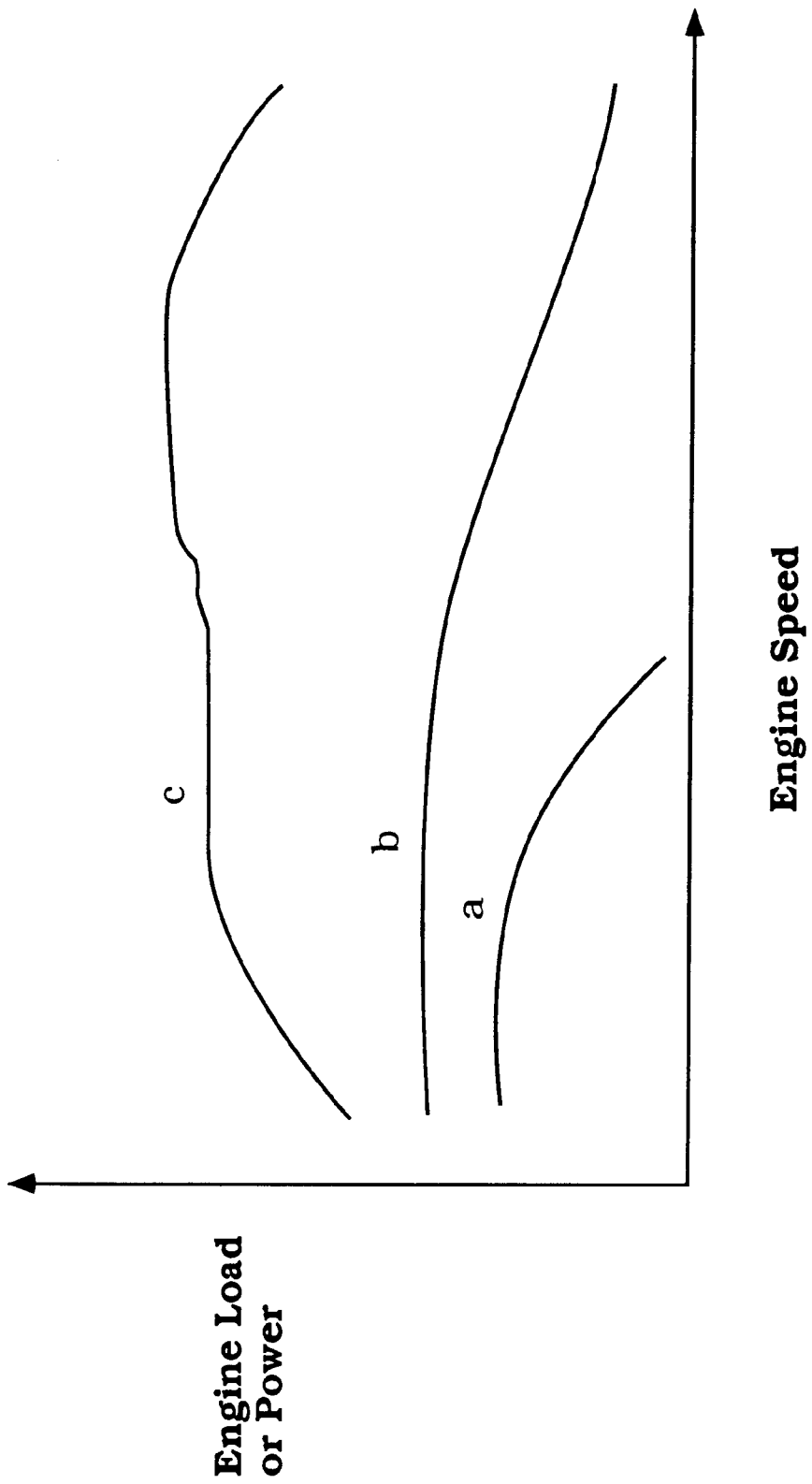
FIG. 10 is a graphical view showing the power output attained during the varying performance and control ranges in accordance with an embodiment of the invention.
Figure 11:
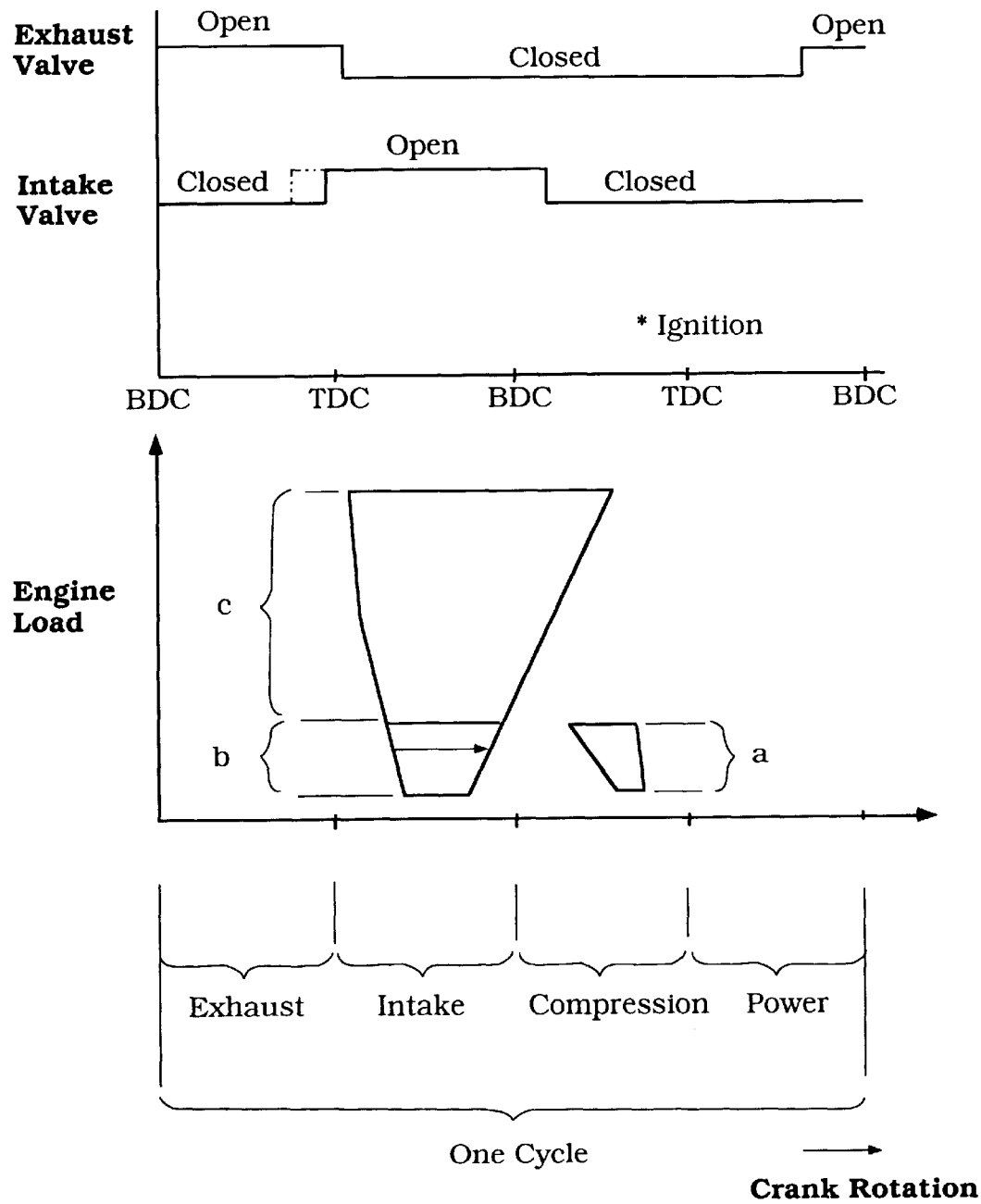
FIG. 11 is a graphical view showing, at the upper portion, the intake and exhaust valve timing, as well as the timing of firing of the spark plug, and, in the lower view, the various control phases.

FIGS. 10 and 11 will be utilized to explain the injection control strategy. In accordance with the invention and as already mentioned, the fuel injection timing is controlled so under low speed/low load conditions injection begins toward the end of the compression stroke. This means that the fuel is injected actually after the intake valve is closed as may be seen in FIG. 11 by the control range "C" under lower load conditions. This provides a lesser total engine power output as seen in FIG. 10 in relation to speed but improves significantly the fuel stratification and thus the fuel economy as already described.

Since the fuel is injected after the intake flow has stopped, the intake air will not disperse the fuel spray and the fuel patch 95 can be maintained. Because of the tumbling action which has been generated, this patch will then be moved into proximity with the gap 47 of the spark plug 45 at the time of firing and thus even though only a small amount of fuel may be injected, combustion will be assured because there will be definitely a stoichiometric mixture at the spark gap at the time of firing. The piston bowl 39 will also assist in confining the fuel patch.

As the power requirements increase, the beginning of injection is advanced while the ending is maintained relatively constant as also seen in FIG. 11. Thus, added fuel will be introduced but very little fuel if any will be introduced at the time when the intake valve is opened.

As the speed and/or load on the engine increases, the control moves to the routine phase "B". During this phase, a greater amount of fuel is injected and the injection is advanced during the beginning of the intake stroke rather than at the end of the compression stroke. This means that some of the air charge will act on the fuel patch so as to redirect it but nevertheless the fuel patch will still be maintained and it will again pass the spark plug at the time of firing. However, under this condition, the fuel patch may actually have made a revolution in the combustion chamber having passed a spark plug one time and then coming into registry with it again, depending upon the weight of tumble. This provides a power output as shown at B in FIG. 10.

As the speed and load increase, the timing of the injection is both advanced and the ending is retarded so as to provide a longer injection cycle. This is done because now there will be a greater amount of fuel in the combustion chamber and a more homogeneous mixture is desired. However, the late injected fuel will ensure a stoichiometric mixture at the presence of the spark plug at the time of firing.

As also seen by the phantom line in FIG. 11 the intake valve timing may be adjusted during engine running. This can increase the ability to induct the air charge.

Figure 13:
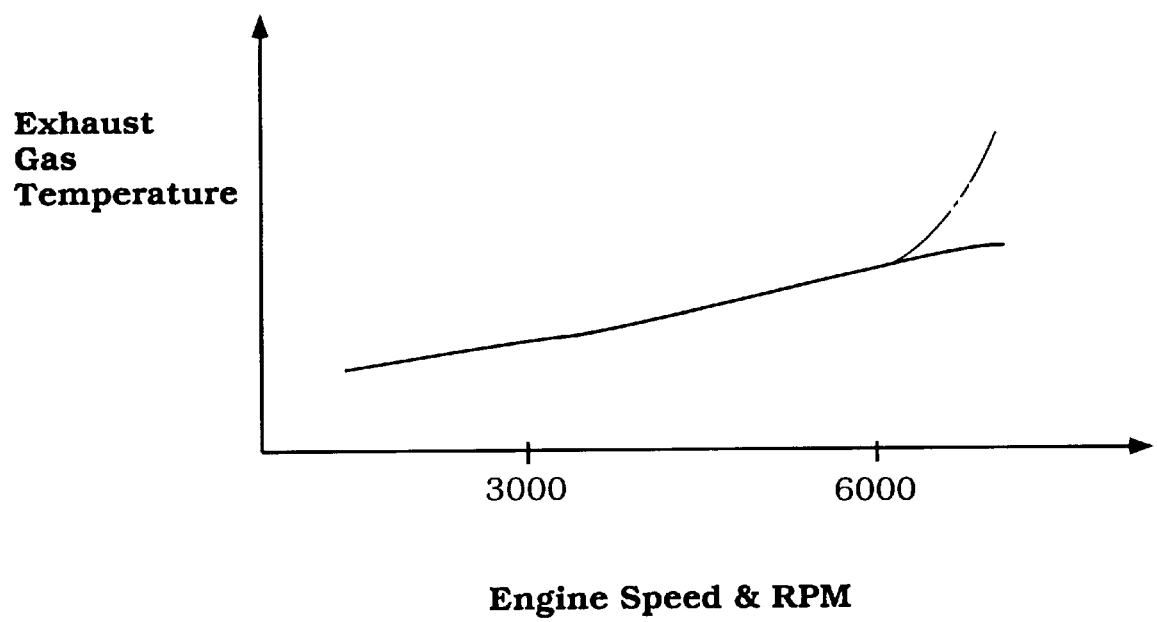
FIG. 13 is a graphical view showing the exhaust gas temperature in relation to intake engine speed and shows how the invention is effective in reducing the exhaust temperature under high load conditions.

In addition to these other advantages the more rapid burning also results in a lower exhaust gas temperature at high speeds as seen in FIG. 13.

Thus, it should be apparent that the described intake passage, combustion chamber configuration and injector arrangement and injection timing all go together to provide an excellent stratification of the charge under conditions when it is desired, the proper decree of turbulence to ensure good flame propagation and unrestricted breathing capabilities to achieve high power output.

It will be readily apparent to those skilled in the art that the foregoing description is that of the preferred embodiment of the invention. Various changes and modifications may be made without departing from the spirit and scope of the invention, as defined by the appended claims.

What is claimed is:

1. An internal combustion engine having a cylinder block, cylinder head assembly defining a cylinder bore closed at one end by a surface of the cylinder head portion of said cylinder block, cylinder head assembly, a piston reciprocating in said cylinder bore and forming a combustion chamber with said cylinder bore and said cylinder head surface, an intake passage arrangement extending from an inlet opening in an outer surface of said cylinder block, cylinder head assembly and serving said combustion chamber through an intake valve seat formed in said cylinder head surface, said intake valve seat lying substantially on one side of a first plane containing the axis of said cylinder bore and being intersected by a second plane also containing said cylinder bore axis and perpendicular to said first plane, a poppet type intake valve supported in cylinder head portion for controlling the opening and closing of said intake valve seat, an exhaust passage extending from an exhaust valve seat disposed in the cylinder head surface on the opposite side of said first plane from said intake valve seat and exiting the cylinder block, cylinder head assembly through an outlet opening formed in said cylinder head portion, a fuel injector mounted in said cylinder block, cylinder head assembly with a discharge port directed into the combustion chamber so as to spray in a direction generally toward said cylinder bore axis, and control means for controlling the timing of injection of fuel from the fuel injector and wherein under low speed/low load conditions the injector begins its injection at a time when the piston is at the end of its compression stroke and under other running conditions the fuel injector begins its injection during the intake stroke.

2. An internal combustion engine as set forth in claim 1 wherein the time of fuel injection termination is held substantially constant as the load and speed increase under low speed/low load conditions and the timing of beginning fuel injection is advanced.

3. An internal combustion engine as set forth in claim 1 wherein the time of fuel injection beginning occurs at a time the intake valve is opened when the load and speed increase beyond the low speed/low load conditions and terminates before the compression begins until the engine is in a high speed/high load condition.

4. An internal combustion engine as set forth in claim 3 wherein the time of fuel injection beginning occurs at a time the intake valve is opened when the load and speed is in a high speed/high load condition and continues during the initial compression.

5. An internal combustion engine as set forth in claim 1 wherein the engine is spark ignited and the spark plug is fired at a point close to top dead center under low speed/low load conditions to increase the pressure in the combustion chamber to a peak at a point close to top dead center.

6. An internal combustion engine as set forth in claim 5 wherein the time of fuel injection termination is held substantially constant as the load and speed increase under low speed/low load conditions and the timing of beginning fuel injection is advanced.

7. An internal combustion engine as set forth in claim 6 wherein the time of fuel injection beginning occurs at a time the intake valve is opened when the load and speed increase beyond the low speed/low load conditions and terminates before the compression begins until the engine is in a high speed/high load condition.

8. An internal combustion engine as set forth in claim 7 wherein the time of fuel injection beginning occurs at a time the intake valve is opened when the load and speed is in a high speed/high load condition and continues during the initial compression.

9. An internal combustion engine as set forth in claim 1, further including a bowl formed in the head of said piston and wherein the fuel injector has a spray axis directed toward said piston bowl.

10. An internal combustion engine as set forth in claim 9, wherein the piston bowl is offset in the head of the piston toward the side of the first plane where the fuel injector is positioned.

11. An internal combustion engine as set forth in claim 10, wherein under low speed/low load conditions the injector begins its injection at a time when the spray therefrom will contact a base of the piston bowl.

12. An internal combustion engine as set forth in claim 11 wherein the engine is spark ignited by a spark plug mounted in the cylinder head and disposed at a side of the piston bowl spaced from the fuel injector.

13. A method of operating an internal combustion engine having a cylinder block, cylinder head assembly defining a cylinder bore closed at one end by a surface of the cylinder head portion of said cylinder block, cylinder head assembly, a piston reciprocating in said cylinder bore and forming a combustion chamber with said cylinder bore and said cylinder head surface, an intake passage arrangement extending from an inlet opening in an outer surface of said cylinder block, cylinder head assembly and serving said combustion chamber through an intake valve seat formed in said cylinder head surface, said intake valve seat lying substantially on one side of a first plane containing the axis of said cylinder bore and being intersected by a second plane also containing said cylinder bore axis and perpendicular to said first plane, a poppet type intake valve supported in cylinder head portion for controlling the opening and closing of said intake valve seat, an exhaust passage extending from an exhaust valve seat disposed in the cylinder head surface on the opposite side of said first plane from said intake valve seat and exiting the cylinder block, cylinder head assembly through an outlet opening formed in said cylinder head portion, a fuel injector mounted in said cylinder block, cylinder head assembly with a discharge port directed into the combustion chamber so as to spray in a direction generally toward said cylinder bore axis, said method comprising the steps of controlling the timing of injection of fuel from the fuel injector such that under low speed/low load conditions the injector begins its injection at a time when the piston is at the end of its compression stroke and under other running conditions the fuel injector begins its injection during the intake stroke.

14. A method of operating an internal combustion engine as set forth in claim 13 wherein the time of fuel injection termination is held substantially constant as the load and speed increase under low speed/low load conditions and the timing of beginning fuel injection is advanced.

15. A method of operating an internal combustion engine as set forth in claim 13 wherein the time of fuel injection beginning occurs at a time the intake valve is opened when the load and speed increase beyond the low speed/low load conditions and terminates before the compression begins until the engine is in a high speed/high load condition.

16. A method of operating an internal combustion engine as set forth in claim 15 wherein the time of fuel injection beginning occurs at a time the intake valve is opened when the load and speed is in a high speed/high load condition and continues during the initial compression.

17. A method of operating an internal combustion engine as set forth in claim 13 wherein the engine is spark ignited and further including the step of firing the spark plug at a point close to top dead center under low speed/low load conditions to increase the pressure in the combustion chamber to a peak at a point close to top dead center.

18. A method of operating an internal combustion engine as set forth in claim 17 wherein the time of fuel injection termination is held substantially constant as the load and speed increase under low speed/low load conditions and the timing of beginning fuel injection is advanced.

19. A method of operating an internal combustion engine as set forth in claim 18 wherein the time of fuel injection beginning occurs at a time the intake valve is opened when the load and speed increase beyond the low speed/low load conditions and terminates before the compression begins until the engine is in a high speed/high load condition.

20. A method of operating an internal combustion engine as set forth in claim 19 wherein the time of fuel injection beginning occurs at a time the intake valve is opened when the load and speed is in a high speed/high load condition and continues during the initial compression.

21. A method of operating an internal combustion engine as set forth in claim 13, further including a bowl formed in the head of said piston and wherein the fuel injector has a spray axis directed toward said piston bowl.

22. A method of operating an internal combustion engine as set forth in claim 21, wherein the piston bowl is offset in the head of the piston toward the side of the first plane where the fuel injector is positioned.

23. A method of operating an internal combustion engine as set forth in claim 22, wherein under low speed/low load conditions the injector begins its injection at a time when the spray therefrom will contact a base of the piston bowl.

24. A method of operating an internal combustion engine as set forth in claim 23 wherein the engine is spark ignited by a spark plug mounted in the cylinder head and disposed at a side of the piston bowl spaced from the fuel injector.

* * * * *